(12) United States Patent
Cheng et al.

(10) Patent No.: US 8,871,867 B2
(45) Date of Patent: Oct. 28, 2014

(54) TERMINAL-MODIFIED CONJUGATED DIENE-VINYL AROMATIC COPOLYMER AND METHOD FOR MANUFACTURING THE SAME

(75) Inventors: Kuei-Lun Cheng, Tainan County (TW); Chen-Pao Huang, Tainan County (TW)

(73) Assignee: Chi Mei Corporation, Tainan (TW)

( * ) Notice: Subject to any disclaimer, the term of this patent is extended or adjusted under 35 U.S.C. 154(b) by 165 days.

(21) Appl. No.: 13/326,532

(22) Filed: Dec. 15, 2011

(65) Prior Publication Data
US 2012/0172528 A1  Jul. 5, 2012

(30) Foreign Application Priority Data
Dec. 31, 2010  (TW) ............................... 99147333 A

(51) Int. Cl.
C08L 83/05  (2006.01)
C08C 19/44  (2006.01)

(52) U.S. Cl.
CPC .................................... *C08C 19/44* (2013.01)
USPC ............................................ 525/105; 528/31

(58) Field of Classification Search
USPC ............................................ 525/105; 528/31
See application file for complete search history.

(56) References Cited

U.S. PATENT DOCUMENTS

| | | | |
|---|---|---|---|
| 3,433,760 A * | 3/1969 | Clark et al. ................... | 524/780 |
| 4,263,401 A * | 4/1981 | Chaumont et al. ............ | 525/106 |
| 5,332,784 A * | 7/1994 | Shiraki et al. ................. | 525/98 |
| 6,013,729 A * | 1/2000 | Tsujimoto et al. ............ | 525/105 |
| 6,369,167 B1 * | 4/2002 | Morita et al. ................. | 525/342 |
| 6,417,270 B1 * | 7/2002 | Wollum et al. ................ | 525/98 |
| 6,759,498 B2 * | 7/2004 | Ikematsu et al. .............. | 526/346 |
| 7,105,611 B2 | 9/2006 | Kimura et al. | |
| 7,378,464 B2 * | 5/2008 | Aoki ............................. | 524/189 |
| 2013/0237666 A1 * | 9/2013 | Nicolini et al. ............... | 525/105 |

FOREIGN PATENT DOCUMENTS

| | | |
|---|---|---|
| CN | 1708549 A | 12/2005 |
| CN | 101903409 A | 12/2010 |
| JP | 53144996 A | 12/1978 |
| JP | 2000273181 A | 10/2000 |

OTHER PUBLICATIONS

JP Office Action dated Mar. 19, 2013.
English Abstract translation of JP53144996 (Published Dec. 16, 1978).
English Abstract translation of JP2000273181 (Published Oct. 3, 2000).
TW Office Action dated Jul. 17, 2013.
English language translation (machine translation) of CN101903409 (published Dec. 1, 2010).
CN Office Action dated Nov. 14, 2013.

* cited by examiner

*Primary Examiner* — Margaret Moore
(74) *Attorney, Agent, or Firm* — McClure, Qualey & Rodack, LLP

(57) ABSTRACT

The invention discloses a terminal-modified conjugated diene-vinyl aromatic copolymer and a method for manufacturing the same. The method comprises the following steps. An organic alkali metal initiator is added into a first mixture containing a conjugated diene monomer and a vinyl aromatic hydrocarbon monomer to perform reaction to obtain a conjugated diene-vinyl aromatic copolymer with active terminal. The conjugated diene-vinyl aromatic copolymer with active terminal reacts with polysiloxane to obtain a terminal-modified conjugated diene-vinyl aromatic copolymer. The aforementioned polysiloxane is expressed as chemical formula (I):

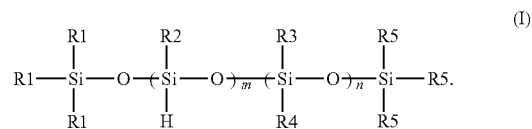

R1, R2, R3 and R5 independently are alkyl group with 1~20 carbon atoms. R4 is selected from one of alkyl group, alkoxy group or hydroxyl group with 1~5 carbon atoms, m is an integer of 2~50, and n is an integer of 0~50.

15 Claims, 1 Drawing Sheet

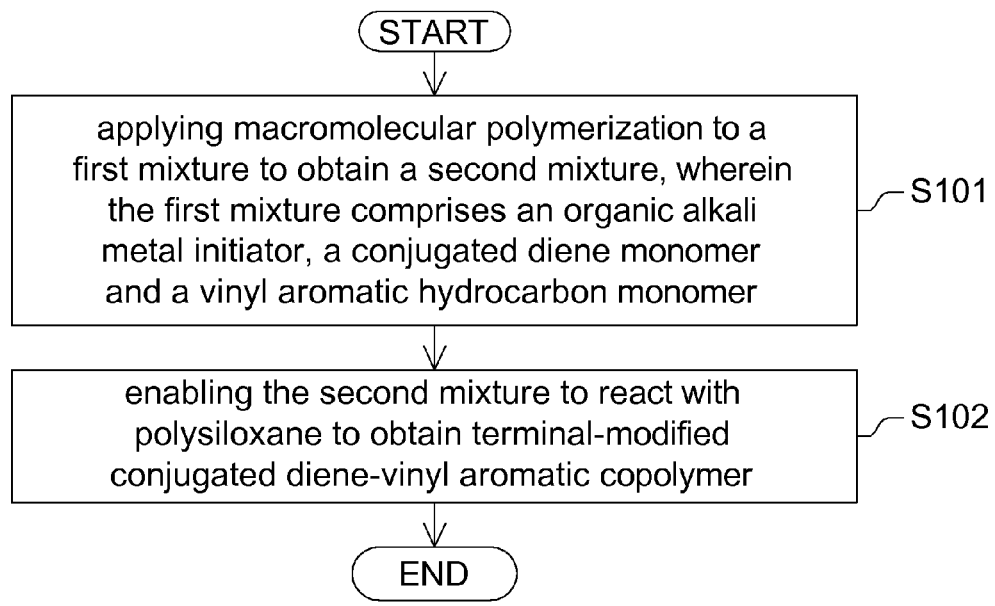

TERMINAL-MODIFIED CONJUGATED DIENE-VINYL AROMATIC COPOLYMER AND METHOD FOR MANUFACTURING THE SAME

This application claims the benefit of Taiwan application Serial No. 99147333, filed on Dec. 31, 2010, the subject matter of which is incorporated herein by reference.

BACKGROUND OF THE INVENTION

1. Field of the Invention

The invention relates to a terminal-modified conjugated diene-vinyl aromatic copolymer and method for manufacturing the same, and more particularly to a terminal-modified conjugated diene-vinyl aromatic copolymer highly compatible with silica and a method for manufacturing the same.

2. Description of the Related Art

Terminal-modified conjugated diene-vinyl aromatic copolymer can be used as a material for manufacturing tires. For tiress, rolling resistance and wet traction are crucial factors to save energy consumption and increase driving safety. Currently, carbon black is added to the conjugated diene-vinyl aromatic copolymer to increase the strength of the tires. In recent years, due to the depletion of oil resource and the global warming issue, the tire industries replace carbon black with silica with an aim of improving the rolling resistance of the tires and therefore reduce energy loss. In comparison with carbon black, silica is more difficult to be uniformly distributed in conjugated diene-vinyl aromatic copolymer. Therefore, the compatibility between silica and conjugated diene-vinyl aromatic copolymer needs to be further increased. According to one improvement method, when adding silica to terminal-modified conjugated diene-vinyl aromatic copolymer during the manufacturing process of tires, a modifier is used to perform blending. However, since the blending uniformity largely affects the properties of the products, product quality may differ from batch to batch, and quality reproducibility is poor. According to another method, a modifier such as a urea compound is added after terminal-modified conjugated diene-vinyl aromatic copolymer is polymerized so that the terminal-modified conjugated diene-vinyl aromatic copolymer reacts with the modifier for increasing compatibility between the terminal-modified conjugated diene-vinyl aromatic copolymer and silica. However, urea compounds are toxic and thus unfavorable to the production employees. Therefore, how to provide a terminal-modified conjugated diene-vinyl aromatic copolymer with silica well distributed in and a method for manufacturing the same has become a prominent task for the industries.

SUMMARY OF THE INVENTION

The invention is directed to a terminal-modified conjugated diene-vinyl aromatic copolymer and method for manufacturing the same. The terminal-modified conjugated diene-vinyl aromatic copolymer is highly compatible with silica, and has excellent performance in wet skid resistance and rolling resistance after being mixed with silica, and helps to reduce energy loss for vehicles.

According to a first aspect of the present invention, a method for manufacturing terminal-modified conjugated diene-vinyl aromatic copolymer is provided. The method comprises the following steps: An organic alkali metal initiator is added into a first mixture containing a conjugated diene monomer and a vinyl aromatic hydrocarbon monomer to perform reaction to obtain a conjugated diene-vinyl aromatic copolymer with active terminal. The conjugated diene-vinyl aromatic copolymer with active terminal reacts with polysiloxane to obtain a terminal-modified conjugated diene-vinyl aromatic copolymer. The aforementioned polysiloxane is expressed as chemical formula (I) of:

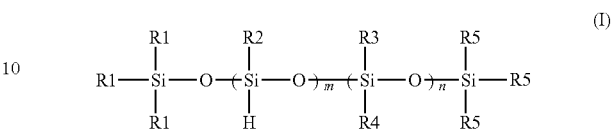

R1, R2, R3 and R5 independently are alkyl group with 1~20 carbon atoms. R4 is selected from one of alkyl group, alkoxy group or hydroxyl group with 1~5 carbon atoms, m is an integer of 2~50, and n is an integer of 0~50.

According to a second aspect of the present invention, a terminal-modified conjugated diene-vinyl aromatic copolymer is provided. The terminal-modified conjugated diene-vinyl aromatic copolymer is obtained by modifying a conjugated diene-vinyl aromatic copolymer by a reaction between an active terminal of the conjugated diene-vinyl aromatic copolymer and the polysiloxane. The aforementioned polysiloxane is expressed as chemical formula of:

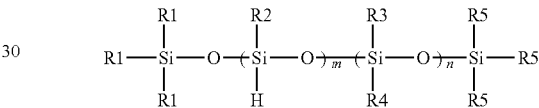

R1, R2, R3 and R5 independently are a hydrocarbon group with 1~20 carbon atoms. m is an integer of 2~50. n is an integer of 0~50. R4 is selected from one of alkyl group, alkoxy group or hydroxyl group with 1~5 carbon atoms.

The above and other aspects of the invention will become better understood with regard to the following detailed description of the preferred but non-limiting embodiment(s). The following description is made with reference to the accompanying drawings.

BRIEF DESCRIPTION OF THE DRAWINGS

FIG. 1 shows a flowchart of a manufacturing method of terminal-modified conjugated diene-vinyl aromatic copolymer.

DETAILED DESCRIPTION OF THE INVENTION

A rubber composition formed from a terminal-modified conjugated diene-vinyl aromatic copolymer in the invention has excellent performance in wet skid and rolling resistance, and can be used for manufacturing tires. The invention is conducive to reducing both the cost and energy saving for manufacture.

Referring to FIG. 1, a flowchart of a manufacturing method of terminal-modified conjugated diene-vinyl aromatic copolymer is shown. Firstly, in step S101, a macromolecular polymerization reaction is applied to a first mixture to obtain a second mixture. The first mixture comprises an organic alkali metal initiator, a conjugated diene monomer and a vinyl aromatic hydrocarbon monomer. For example, the second mixture in the manufacturing method of the present embodiment comprises a conjugated diene compound-vinyl aromatic copolymer with active terminal. The conjugated diene-vinyl aromatic copolymer is formed by copolymerizing the conjugated diene monomer and the vinyl aromatic hydrocarbon monomer. The copolymer comprises a conjugated diene monomer unit and a vinyl aromatic hydrocarbon monomer unit. That is, the conjugated diene monomer unit and the vinyl aromatic hydrocarbon monomer unit, respectively refer to the structural units of the conjugated diene monomer and the vinyl aromatic hydrocarbon monomer in the conjugated diene-vinyl aromatic copolymer after the conjugated diene monomer and the vinyl aromatic hydrocarbon monomer are copolymerized. The vinyl aromatic hydrocarbon monomer may comprise styrene, α-methyl styrene or a combination thereof. The conjugated diene monomer may comprise 1,3-butadiene, isoprene, 1,3-pentadiene, 2-ethyl-1,3-butadiene, 2,3-dimethyl butadiene, 2-methyl pentadiene, 4-methyl pentadiene, 2,4-hexadiene or a combination thereof. Due to the polymerization, the conjugated diene monomer has a 1,4-structure obtained from 1,4-polymerization and a 1,2-structure obtained from 1,2-polymerization. The 1,4-structure and the 1,2-structure may co-exist in a molecular chain. The 1,4-structure can be further divided into a cis-structure and a trans-structure. The 1,2-structure is a structure having a vinyl group at the side chain. The (1,2) vinyl structure substantially amounts to 10%~90% of conjugated diene monomer unit of the polymerized conjugated diene-vinyl aromatic copolymer. In some embodiments, the (1,2) vinyl structure substantially amounts to 50%~90% of the conjugated diene monomer unit. The conjugated diene monomer unit substantially amounts to 74 wt. %~84 wt. % the manufactured terminal-modified conjugated diene-vinyl aromatic copolymer. In addition, the vinyl aromatic hydrocarbon monomer unit substantially amounts to 16 wt. %~26 wt. % of the terminal-modified conjugated diene-vinyl aromatic copolymer.

In one embodiment, the conjugated diene monomer is 1,3-butadiene, and the vinyl aromatic hydrocarbon monomer is styrene.

The conjugated diene-vinyl aromatic copolymer comprises a conjugated diene monomer unit and a vinyl aromatic hydrocarbon monomer unit. The conjugated diene monomer unit comprises a 1,3-butadiene monomer unit, an isoprene monomer unit, a 1,3-pentadiene monomer unit, a 2-ethyl-1, 3-butadiene monomer unit, a 2,3-dimethyl butadiene monomer unit, a 2-methyl pentadiene monomer unit, a 4-methyl pentadiene monomer unit, a 2,4-hexadiene monomer unit or a combination thereof. The vinyl aromatic hydrocarbon monomer unit comprises a styrene monomer unit, a α-methyl styrene monomer unit or a combination thereof. In one embodiment, the conjugated diene monomer unit is a 1,3-butadiene monomer unit, and the vinyl aromatic hydrocarbon monomer unit is a styrene monomer unit.

Besides, the organic alkali metal initiator may comprise ethyl lithium, n-propyl lithium, isopropyl lithium, n-butyllithium, n-pentyl lithium, phenyl lithium, tolyl lithium or a combination thereof.

In some embodiments, the first mixture may further comprise a solvent and a micro-structure modifier. For example, the solvent used in the manufacturing method of the present embodiment can also be realized by a non-polar solvent containing such as a saturated hydrocarbon and an aromatic hydrocarbon and so on but not limited thereto. The solvent may comprise an aliphatic hydrocarbon (such as pentane, hexane, and heptane), an alicyclic hydrocarbon (such as cyclopentane, cyclohexane, methyl cyclopentane, and methyl cyclohexane), an aromatic hydrocarbon (such as benzene, toluene, and xylene), or a combination thereof. In the polymerization process of the present embodiment, for enabling the vinyl aromatic hydrocarbon monomer compound and the conjugated diene monomer compound to be randomly copolymerized, a small amount of a polar compound (also referred as micro-structure modifier) can be added as an vinylating agent. Such polar compound can also be realized by an ether (such as tetrahydrofuran, diethyl ether, dioxane, 1,2-dimethoxyethane, 1,2-dibutoxyethane, diethylene glycol dimethyl ether, diethylene glycol dibutyl ether, dimethoxybenzene, and 2,2-ditetrahydrofurylpropane (DTHFP) and so on), a tertiary amine (such as tetramethylethylenediamine, dipiperidine ethane, trimethylamine, triethylamine, pyridine, and quinuclidine and so on), an alkali metal alkyl alcoholate (such as potassium tert-pentoxide, potassium tert-butoxide, sodium tert-butoxide, and sodium tert-pentoxide and so on), a phosphine compound (such as triphenylphosphine and so on), alkyl or aryl sulfonic acid compound and so on. However, the present disclosure is not limited thereto. These polar compounds can be used individually or as a combination of two or more compounds.

In one embodiment, the usage amount of micro-structure modifier is based on target objects and effects. Normally, the micro-structure modifier has 0.01~100 moles with respect to 1 mole of the initiator. According to an amount of the desired (1,2) ethylene structure, the polar compound (vinylating agent) can be suitably used as a micro-structure regulator for the diene part of the polymer.

Referring to FIG. 1, in step S102, the second mixture is enabled to react with a polysiloxane to obtain a terminal-modified conjugated diene-vinyl aromatic copolymer. In this step, mainly the active terminal of the conjugated diene-vinyl aromatic copolymer in the second mixture reacts with the polysiloxane in the solvent and therefore be modified. In details, the organic alkali metal initiator enables the active terminal of the conjugated diene of the conjugated diene-vinyl aromatic copolymer to react with polysiloxane to be modified. In one embodiment, polysiloxane is expressed as chemical formula (I) of:

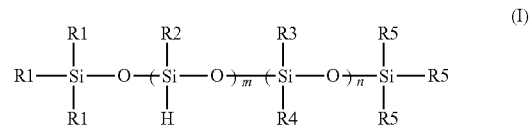

R1, R2, R3 and R5 independently are an alkyl group with 1~20 carbon atoms. R4 is selected from one of an alkyl group, an alkoxy group or hydroxyl group with 1~5 carbon atoms. m is an integer of 2~50. n is an integer of 0~50. The polysiloxine can be functioned as a terminator for terminating the polymerization process of the second mixture. Moreover, the polysiloxane can be functioned as a modifier since it modifies the active terminal of the conjugated diene-vinyl aromatic copolymer. In some embodiments, the polysiloxane can be soaked in a solvent of aluminum oxide, molecular sieve or sodium tablet to be de-hydrated. Alternatively, the polysiloxane and the solvent can be de-hydrated by azeotropic distillation with solvent. In embodiments, the polysiloxane is added to the second mixture comprising the conjugated diene-vinyl aromatic copolymer with active terminal which is obtained after polymerizing the first mixture. Compared with the conventional manufacturing process in which polysiloxane is added and blended in the latter blending process, the invention, in which the polysiloxane is directly added into the macromolecular polymerization process and used as a terminator and a modifier, not only makes polysiloxane more uniformly dispersed in the terminal-modified conjugated diene-vinyl aromatic copolymer, but also reduces the usage of the amount of the polysiloxane and therefore reduces material cost.

In embodiments, the usage of the amount of polysiloxane is 0.05~20 weight parts of the terminal-modified conjugated diene-vinyl aromatic copolymer. In other words, the usage of the amount of polysiloxane is 0.05~20 weight parts with respect to 100 weight parts of terminal-modified conjugated diene-vinyl aromatic copolymer. In some embodiment, polysiloxane is expressed as chemical formula (II).

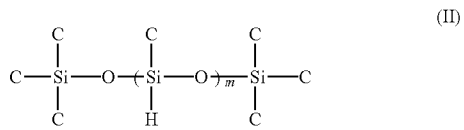

(II)

The viscosity of the polysiloxane substantially may be 10 mm$^2$/s~100 mm$^2$/s. In one embodiment, the polysiloxane can be realized by a mixture of two polysiloxane types with different molecular weights (that is, with different m value). The polysiloxane which m is 4~7 substantially amounts to 40 wt. %~50 wt. % of the whole polysiloxane, and the polysiloxane which m is 11~13 substantially amounts to 50 wt. %~60 wt. % of the weight of the whole polysiloxane.

In one embodiment, a poor solvent (for example, an alcohol such as methanol, ethanol or isopropyl alcohol) can be added to the terminal-modified conjugated diene-vinyl aromatic copolymer obtained from modification to separate polymers out. Alternatively, hot water or water vapor (hotter than the solvent) can be used to remove the solvent so that the polymers can be separated out. In one embodiment, a polydispersity index (PDI) of the terminal-modified conjugated diene-vinyl aromatic copolymer is substantially 1~3, and an average molecular weight of which is substantially 20000~1000000. The analysis is performed by using the gel permeation chromatography (GPC, made by Waters Company) having the functions for detecting differential curvature detection and light scattering detection.

A number of embodiments and comparative examples clearly describe the manufacturing process of different chemical components used as modifiers in macromolecular polymerization. The property differences between the rubber compositions formed by the modified conjugated diene-vinyl aromatic copolymers manufactured according to these embodiments and comparative examples are further compared. Unless further explanation, in the descriptions for the manufacturing process for the modified conjugated diene-vinyl aromatic copolymer, the unit phr (parts per hundreds of rubber) of a specific substance is defined with respect to 100 weight parts of the whole styrene monomer and butadiene monomer. For example, "0.3 phr of n-butyllithium" refers to 0.3 weight parts of n-butyllithium per 100 weight parts of styrene monomer and butadiene monomer. In the process of manufacturing rubber composition, the unit phr of a specific substance is defined with respect to 100 weight parts of terminal-modified conjugated diene-vinyl aromatic copolymer. For example, "30 phr of silica" refers to 30 weight parts of silica per 100 weight parts of modified styrene-butadiene copolymer.

Embodiment 1

Firstly, 800 g of cyclohexane is added to a reactor and used as a solvent, and a constant temperature of 45° C. is maintained. Next, 0.3 phr (0.64 g) of 2,2-ditetrahydrofurylpropane (DTHFP) is added to the reactor and used as a micro-structure modifier. Then, 0.05 phr of n-butyllithium is added to the reactor and used as an initiator for macromolecular polymerization. The mole proportion of the micro-structure modifier to the initiator is substantially 2:1. Afterwards, 44.7 g of styrene used as a first monomer and 168.3 g of butadiene used as a second monomer are added to the reactor for macromolecular polymerization, wherein the feeding duration is 50 minutes. After macromolecular polymerization is performed for about 55 minutes, 3.5 phr of butadiene monomer for a polymer chain terminal is added. Meanwhile, the samples are taken and the solvent of the samples is removed. The vinyl(1, 2) structure measured by the infra-red (IR) spectroscopy or nuclear magnetic resonance (NMR) spectroscopy amounts to 63% of the cis-, the trans- and the vinyl structure of the butadiene monomer unit. The macromolecular styrene monomer unit approximately amounts to about 21 wt. % of the overall butadiene monomer unit and styrene monomer unit. After about 5 minutes, 0.3 phr of poly methyl hydrogen silicon (PMHS) which is used as a terminator and a modifier is added, and the mixture is discharged after blending for 10 minutes. Alcohol (such as methanol, ethanol or isopropyl alcohol) is used for separation or the solvent is removed by water vapor. After the drying process, the terminal-modified conjugated diene-vinyl aromatic copolymer is obtained. The poly methyl hydrogen silicon used in the present embodiment of the invention is TSF484 (made by GE Toshiba Silicones Co. Ltd.). In the content of the poly methyl hydrogen silicon, the polysiloxane with the chemical formula (II) which m is about 5.85 amounts to 47.2 wt. % of the whole polysiloxane, and the polysiloxane with the chemical formula (II) which m is about 12.2 substantially amounts to 52.8 wt. % of the whole polysiloxane. The viscosity of the sample is 25 mm$^2$/s (at the temperature of 25° C.). The average molecular weight of the obtained terminal-modified conjugated diene-vinyl aromatic copolymer is 486000, the average molecular number of which is 310000, and the polydispersity index (PDI) of which is Mw/Mn=1.55.

Comparative Example 1

Except that the added modifier is replaced by aminopropyltrimethoxysilane, the manufacturing method of comparative example 1 is similar to that of embodiment 1, and the similarities are not repeated.

Comparative Example 2

Except that the added modifier is replaced by 1-[3-(trimethoxysilyl)propyl]urea, the manufacturing method of comparative example 2 is similar to that of embodiment 1, and the similarities are not repeated.

Comparative Example 3

Except that the added modifier is replaced by methanol, the manufacturing method of comparative example 3 is similar to that of embodiment 1, and the similarities are not repeated.

Embodiment 2

Except that the usage of the added modifier poly methyl hydrogen silicon is replaced by 0.05 phr, the manufacturing method of embodiment 2 is similar to that of embodiment 1, and the similarities are not repeated. The average molecular weight of the obtained terminal-modified conjugated diene-vinyl aromatic copolymer is 541000, the average molecular number of which is 345000, and the polydispersity index (PDI) of which is Mw/Mn=1.57.

Embodiment 3

Except that the usage of the added modifier poly methyl hydrogen silicon is replaced by 0.1 phr, the manufacturing method of embodiment 3 is similar to that of embodiment 1, and the similarities are not repeated. The average molecular weight of the obtained terminal-modified conjugated diene-vinyl aromatic copolymer is 533000, the average molecular number of which is 350000, and the polydispersity index (PDI) of which is Mw/Mn=1.52.

Embodiment 4

Except that the usage of the added modifier poly methyl hydrogen silicon is replaced by 0.2 phr, the manufacturing method of embodiment 4 is similar to that of embodiment 1, and the similarities are not repeated. The average molecular weight of the obtained terminal-modified conjugated diene-vinyl aromatic copolymer is 547000, the average molecular number of which is 346000, and the polydispersity index (PDI) of which is Mw/Mn=1.58.

Embodiment 5

Except that the usage of the added modifier poly methyl hydrogen silicon is replaced by 0.4 phr, the manufacturing method of embodiment 5 is similar to that of embodiment 1, and the similarities are not repeated. The average molecular weight of the obtained terminal-modified conjugated diene-vinyl aromatic copolymer is 500000, the average molecular number of which is 332000, and the polydispersity index (PDI) of which is Mw/Mn=1.5.

Embodiment 6

Except that the usage of the added modifier poly methyl hydrogen silicon is replaced by 0.5 phr, the manufacturing method of embodiment 6 is similar to that of embodiment 1, and the similarities are not repeated. The average molecular weight of the obtained terminal-modified conjugated diene-vinyl aromatic copolymer is 507000, the average molecular number of which is 334000, and the polydispersity index (PDI) of which is Mw/Mn=1.52.

Embodiment 7

Except that the usage of the added modifier poly methyl hydrogen silicon is replaced by 0.6 phr, the manufacturing method of embodiment 7 is similar to that of embodiment 1, and the similarities are not repeated. The average molecular weight of the obtained terminal-modified conjugated diene-vinyl aromatic copolymer is 551000, the average molecular number of which is 349000, and the polydispersity index (PDI) of which is Mw/Mn=1.58.

Next, the terminal-modified conjugated diene-vinyl aromatic copolymer manufactured according to the embodiments and comparative examples above are used for forming rubber compositions individually, and the properties of each rubber composition are tested. The following ingredients are added into the terminal-modified conjugated diene-vinyl acromatic copolymer of embodiments 1~7 and comparative examples 1~3 for forming the rubber compositions:
Silica (made by ULTRASIL EVONIK)
Oil (#3, CPC Corporation of Taiwan)
Antioxidant (lx-1076, made by CIBA)
Si69 (bi-3-(triethoxysilyl propyl)tetrasulfide, made by Degussa AG)
Zinc oxide (ZnO, made by HA)
Stearic acid (TPSA1865)
Diphenyl guanidine (made by FLEXSYS)
N-cyclohexyl-2-benzothiazolesulphenamide (CBS, made by FLEXSYS)
Sulfur (Triangle Brand)

Firstly, after 700 g of terminal-modified conjugated diene-vinyl aromatic copolymers manufactured according to embodiments 1~7 and comparative examples 1~3 are respectively blended for 1 minute, 30 phr of silica, 10 phr of oil, 1 phr of antioxidant (lx-1076) and 4.8 phr of silane coupling agent (Si69) are added and blended for 1.5 minutes. After that, 30 phr of silica are further added, and the mixture is discharged when the temperature reaches 150° C. Then, 2 phr of the zinc oxide (ZnO), 2 phr of the stearic acid and 2 phr of the diphenyl guanidine are respectively added and blended. The above procedure is implemented by a Banbury-type mixer.

Then, 2 phr of n-cyclohexyl-2-benzothiazolesulphenamide (CBS) and 2 phr of sulfur are added, and a rubber composition is obtained accordingly. The above procedure is implemented with a roll-type mixer. In the following disclosure, the properties of the rubber compositions formed by terminal-modified conjugated diene-vinyl aromatic copolymers manufactured according to embodiments 1~7 and comparative examples 1~3 are analyzed and compared.

The properties of each rubber composition are measured with a viscoelasticity measuring device (model DMA Q800, made by TA Instruments). The measurement mode is stretching mode, and the measuring frequency is 20 Hz. The objects of measurement include dynamic storage modulus of elasticity (E) and loss tangent (tan δ). When measuring the dynamic storage modulus of elasticity (E), the temperature is set at 60° C., the deformation degree of measurement is 0.5~10%. The dynamic storage modulus difference of elasticity (ΔE') can be obtained by deducting the dynamic storage modulus of elasticity measured when the deformation degree is 10% from the dynamic storage modulus of elasticity measured when the deformation degree is 0.5%. The smaller the value of the dynamic storage modulus difference of elasticity (ΔE') is, the better the compatibility between the rubber composition and silica is. Besides, the temperature rising rate is 3° C. per minute when measuring the loss tangent (tan δ) and the loss tangent is measured at the temperature of 0° C. and 60° C. At 0° C., the high loss tangent indicates the high wet traction of the rubber composition. At 60° C., the high the loss tangent indicates the high rolling resistance of the rubber composition. Detailed measurement data of rubber compositions formed by the terminal-modified conjugated diene-vinyl aromatic copolymers manufactured according to each example are summarized as Table 1 below.

TABLE 1

|  | ΔE' | tanδ (0° C.) | tanδ (60° C.) |
| --- | --- | --- | --- |
| Embodiment 1 | 1.6 | 1.253 | 0.051 |
| Comparative example 1 | 1.7 | 1.248 | 0.056 |
| Comparative example 2 | 1.7 | 1.251 | 0.058 |
| Comparative example 3 | 2.0 | 1.245 | 0.068 |
| Embodiment 2 | 2.0 | 1.249 | 0.060 |
| Embodiment 3 | 1.9 | 1.251 | 0.057 |
| Embodiment 4 | 1.7 | 1.251 | 0.054 |
| Embodiment 5 | 1.6 | 1.255 | 0.051 |

TABLE 1-continued

|  | ΔE' | tanδ (0° C.) | tanδ (60° C.) |
|---|---|---|---|
| Embodiment 6 | 1.7 | 1.256 | 0.054 |
| Embodiment 7 | 1.8 | 1.255 | 0.058 |

In embodiments 1~7 and comparative examples 1~3 in Table 1, the vinyl(1,2) structure amounts to 63% of the cis-, the trans- and the vinyl structure of the butadiene monomer unit, which is high vinyl grade. In the measurement results of the examples in which the vinyl(1,2) grade is high, the embodiments 1 and 5 has the smallest dynamic storage modulus difference of elasticity (ΔE') 1.6. Compared with the dynamic storage modulus differences of elasticity (ΔE') of comparative examples 1~3, which are 1.7 and 2.0, the rubber compositions formed by the terminal-modified conjugated diene-vinyl aromatic copolymers manufactured according to embodiments 1 and 5 are more compatible with silica.

At 0° C., the measured loss tangent (tan δ) of the rubber compositions formed by the terminal-modified conjugated diene-vinyl aromatic copolymers manufactured according to embodiments 1~7 are 1.249~1.256. Compared with the blank experiments (comparative examples 1 and 3), the rubber compositions formed by the terminal-modified conjugated diene-vinyl aromatic copolymers manufactured according to embodiment 1~7 have superior performance in wet traction. The experimental results also show that the measured loss tangent (tan δ) at 0° C. of the rubber compositions formed by the terminal-modified conjugated diene-vinyl aromatic copolymer manufactured according to most embodiments are also superior to that manufactured according to comparative example 2 in which other modifiers are used.

At 60° C., the measured loss tangent (tan δ) of the rubber compositions formed by the modified conjugated diene-vinyl aromatic copolymer manufactured according to embodiments 1~7 are 0.051~0.06. Compared with the blank experiments (comparative example 3), the rubber compositions formed by the terminal-modified conjugated diene-vinyl aromatic copolymers manufactured according to embodiment 1~7 have superior performance in rolling resistance. The experimental results also show that the measured loss tangent (tan δ) at 60° C. of the rubber compositions formed by the terminal-modified conjugated diene-vinyl aromatic copolymer manufactured according to most embodiments are also superior to that manufactured according to comparative examples 1 and 2 in which other modifiers are used.

According to the terminal-modified conjugated diene-vinyl aromatic copolymer and the method for manufacturing the same of the invention, the blending technology is not used, and terminal-modified conjugated diene-vinyl aromatic copolymer is obtained through direct reaction. Compared with the conventional manufacturing process in which polysiloxane is added and blended in the latter blending process, the invention, in which polysiloxane is directly added in the macromolecular polymerization process and used as a terminator and a modifier, not only makes polysiloxane more uniformly dispersed in the terminal-modified conjugated diene-vinyl aromatic copolymer, but also reduces the usage of the amount of polysiloxane and therefore reduced material cost.

While the invention has been described by way of example and in terms of the preferred embodiment (s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A method for manufacturing a terminal-modified conjugated diene-vinyl aromatic copolymer, comprising:
adding an organic alkali metal initiator into a first mixture containing a conjugated diene monomer and a vinyl aromatic hydrocarbon monomer to obtain a conjugated diene-vinyl aromatic copolymer with active terminal, wherein the active terminal of the conjugated diene-vinyl aromatic copolymer is formed by the alkali metal initiator; and
enabling the conjugated diene-vinyl aromatic copolymer with active terminal to react with a polysiloxane to obtain the terminal-modified conjugated diene-vinyl aromatic copolymer, wherein the polysiloxane is expressed as chemical formula (I) of:

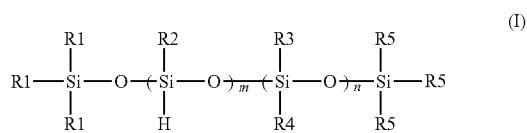

wherein, R1, R2, R3 and R5 are independently alkyl group with 1~20 carbon atoms, R4 is selected from one of alkyl group, alkoxy group or hydroxyl group with 1~5 carbon atoms, m is an integer of 2~50, and n is an integer of 0~50.

2. The method for manufacturing the terminal-modified conjugated diene-vinyl aromatic copolymer according to claim 1, wherein the polysiloxane has 0.05~20 weight parts with respect to 100 weight parts of the terminal-modified conjugated diene-vinyl aromatic copolymer.

3. The method for manufacturing the terminal-modified conjugated diene-vinyl aromatic copolymer according to claim 1, wherein the polysiloxane is expressed as chemical formula of:

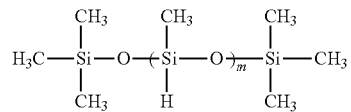

wherein a viscosity of the polysiloxane is 10 mm²/s~100 mm²/s.

4. The method for manufacturing the terminal-modified conjugated diene-vinyl aromatic copolymer according to claim 1, wherein the polysiloxane is expressed as chemical formula of:

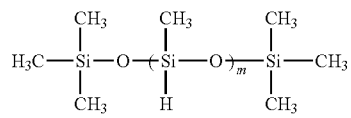

wherein the polysiloxane which m is 4~7 amounts to 40 wt. %~50 wt. % of the whole polysiloxane, and the polysiloxane which m is 11~13 amounts to 50 wt. %~60 wt. % of the whole polysiloxane.

5. The method for manufacturing the terminal-modified conjugated diene-vinyl aromatic copolymer according to claim 1, wherein the conjugated diene-vinyl aromatic copolymer comprises a conjugated diene monomer unit and a vinyl aromatic hydrocarbon monomer unit, the conjugated diene monomer unit comprises a 1,3-butadiene monomer unit, an isoprene monomer unit, a 1,3-pentadiene monomer unit, a 2-ethyl-1,3-butadiene monomer unit, a 2,3-dimethyl butadiene monomer unit, a 2-methyl pentadiene monomer unit, a 4-methyl pentadiene monomer unit, a 2,4-hexadiene monomer unit, or a combination thereof, the vinyl aromatic hydrocarbon monomer unit comprises a styrene monomer unit, an α-methyl styrene monomer unit, or a combination thereof.

6. The method for manufacturing the terminal-modified conjugated diene-vinyl aromatic copolymer according to claim 5, wherein the conjugated diene monomer unit is the 1,3-butadiene monomer unit, and the vinyl aromatic hydrocarbon monomer unit is the styrene monomer unit.

7. The method for manufacturing the terminal-modified conjugated diene-vinyl aromatic copolymer according to claim 1, wherein the conjugated diene-vinyl aromatic copolymer comprises a conjugated diene monomer unit and a vinyl aromatic hydrocarbon monomer unit, the conjugated diene monomer unit further comprises a vinyl structure, the vinyl structure amounts to 10%~90% of the conjugated diene monomer unit of the conjugated diene-vinyl aromatic copolymer.

8. The method for manufacturing the terminal-modified conjugated diene-vinyl aromatic copolymer according to claim 7, wherein the vinyl structure amounts to 50%~90% of the conjugated diene monomer unit, the conjugated diene monomer unit amounts to 74%~84% of the weight of the terminal-modified conjugated diene-vinyl aromatic copolymer, the vinyl aromatic hydrocarbon monomer unit amounts to 16 wt. %~26 wt. % of the terminal-modified conjugated diene-vinyl aromatic copolymer.

9. The method for manufacturing the terminal-modified conjugated diene-vinyl aromatic copolymer according to claim 1, wherein the organic alkali metal initiator comprises ethyl lithium, n-propyl lithium, isopropyl lithium, n-butyl-lithium, n-pentyl lithium, phenyl lithium, tolyl lithium, or a combination thereof.

10. The method for manufacturing the terminal-modified conjugated diene-vinyl aromatic copolymer according to claim 1, wherein a polydispersity index (PDI) of the terminal-modified conjugated diene-vinyl aromatic copolymer is 1~3.

11. The method for manufacturing the terminal-modified conjugated diene-vinyl aromatic copolymer according to claim 1, wherein an average molecular weight of the terminal-modified conjugated diene-vinyl aromatic copolymer is 20,000~1,000,000.

12. The method for manufacturing the terminal-modified conjugated diene-vinyl aromatic copolymer according to claim 1, wherein the first mixture further comprises a solvent and a micro-structure modifier, the solvent comprises cyclohexane, and the micro-structure modifier comprises 2,2-ditetrahydrofurylpropane (DTHFP).

13. The method for manufacturing the terminal-modified conjugated diene-vinyl aromatic copolymer according to claim 12, wherein a mole proportion of the micro-structure modifier to a mole of the organic alkali metal initiator is 0.01~100.

14. The method for manufacturing the terminal-modified conjugated diene-vinyl aromatic copolymer according to claim 1, wherein the conjugated diene-vinyl aromatic copolymer with active terminal reacts with the polysiloxane to obtain the terminal-modified conjugated diene-vinyl aromatic copolymer through the active terminal.

15. The method for manufacturing the terminal-modified conjugated diene-vinyl aromatic copolymer according to claim 14, wherein the polysiloxane is used as a terminator and a modifier.

* * * * *